United States Patent [19]

Kik et al.

[11] Patent Number: 4,517,248

[45] Date of Patent: May 14, 1985

[54] PROCESS FOR APPLYING A COATING COMPOSITION TO A SUBSTRATE, AND THE COATED SUBSTRATE THUS OBTAINED

[75] Inventors: Leendert A. Kik, Wassenaar; Pieter H. J. Schuurink, Noordwijk-binnen, both of Netherlands

[73] Assignee: Akzo nv, Arnhem, Netherlands

[21] Appl. No.: 566,960

[22] Filed: Dec. 29, 1983

Related U.S. Application Data

[63] Continuation of Ser. No. 393,878, Jun. 30, 1982, abandoned.

[30] Foreign Application Priority Data

Jul. 2, 1981 [NL] Netherlands ........................ 8103172

[51] Int. Cl.$^3$ ........................ B32B 15/04; B05D 1/02

[52] U.S. Cl. .................................. 428/457; 427/292; 427/327; 427/421; 427/426

[58] Field of Search ............... 427/191, 196, 327, 426, 427/422, 292, 195, 44; 428/457

[56] References Cited

U.S. PATENT DOCUMENTS

| | | | |
|---|---|---|---|
| 2,723,204 | 11/1955 | Pottberg et al. | 427/196 X |
| 2,754,228 | 7/1956 | Bede | 427/422 |
| 3,168,411 | 2/1965 | Walsh | 427/196 |
| 3,326,098 | 6/1967 | Boettler | 427/422 X |
| 3,676,197 | 7/1972 | Harrison et al. | 427/426 X |
| 3,754,976 | 8/1973 | Babecki et al. | 427/192 |
| 4,244,989 | 1/1981 | Noomen | 427/421 |

*Primary Examiner*—Shrive P. Beck

*Attorney, Agent, or Firm*—Stevens, Davis, Miller & Mosher

[57] ABSTRACT

A process is provided for cleaning a substrate and providing it with a durable corrosion protecting coating by subjecting a part of the substrate to a blasting treatment and simultaneously hitting the same part of the substrate by a stream of a film forming binder. Structures in a marine environment can thus be provided with a durable coating in one combined operation of cleaning and coating. The invention also relates to the substrate thus obtained.

10 Claims, No Drawings

PROCESS FOR APPLYING A COATING COMPOSITION TO A SUBSTRATE, AND THE COATED SUBSTRATE THUS OBTAINED

This application is a continuation, of application Ser. No. 393,878, filed June 30, 1982 now abandoned.

This invention relates to a process for applying a coating composition to a substrate by subjecting the substrate to a blasting treatment in which it is hit by a stream of blasting particles.

It is known that the surface of a constructional material such as steel or concrete may be cleaned by blasting it with a stream of blasting particles. As example of suitable blasting agents may be mentioned: inorganic materials such as glass beads, metal slag, steel grit, wire blasting, aluminium oxide beads, such as corundum, and sand. For use in a blasting treatment some appropriate kinetic energy is imparted to the blasting particles, for instance by introducing them in an air steam. In actual practice water is generally added to the stream of blasting particles in order to reduce the creation of dust by the blasting agent, rust or other deposits that are to be removed from the substrate. The formation of dust is objectionable for reasons of health and obstruction of visibility during the treatment.

Further, it is usual for the blast-cleaned substrate to be very quickly provided with a coating in order to restrain the early occurence of corrosion on the cleaned substrate. Cleaning the substrate and applying a coating to it, however, are two separate treatments, so that some early corrosion cannot normally be prevented entirely. As is known, corrosion underneath a coating affects the ability of the substrate to hold the coating, which will give rise to further corrosion so that the coating will soon lose its protective effect. Corrosion particularly occurs during the treatment of marine structures, such as oil platforms, pipe lines, landing stages and piers, and the like, which are generally exposed to a wind laden with salt particles or seawater droplets, so that corrosive sea salt will almost invariably get between the substrate and the coating.

An object of the present invention is to provide a process which permits cleaning the substrate and providing it with a durable corrosion protecting coating in one operation. An advantage of this process is that structures in a marine environment can be provided with a durable coating. Another advantage is that under conditions where oil, grease and sulphur-containing contaminants are likely to impair the substrate, the invention makes it possible to obtain an excellent protective coating that will last a very long time. A further advantage is that surfaces wetted by rain, water running over them or puddles and surfaces that are under water may be provided with a satisfactory coating. Finally, use of the integrated process not only saves time, but also the cost of scaffolding.

The process according to the present invention is characterized in that substrate is simultaneously hit in the same place by a stream of film forming binder.

The stream of blasting particles can be obtained in a known manner by introducing blasting particles in a fast flowing, heated or non-heated medium such as a gas, for instance air, a vapour, for instance steam, or water. It is preferred that use should be made of air, more particularly air which emanates from a blast nozzle at a pressure of 2 to 10 bar at a feed rate of 0.1 to 12 $m^3$/min. The air supplied is fed from a nozzle which has an internal diameter of, for instance, 2 to about 13 mm and is usually made of a hard metal or a ceramic material.

A stream of blasting particles can also be obtained in a known manner by using as the blasting device a blast nozzle. This blast nozzle essentially comprises a vaned rotor partially surrounded by a housing provided with an inlet and an outlet for the blasting particles. The rotor imparts the desired speed to the blasting particles by centrifugal force. This method does not require the presence in the stream of blasting particles of a gas or a liquid; the surrounding air, however, will generally be entrained by the fast moving blasting particles. It is only essential that a stream of blasting particles hits the substrate. The above-envisaged methods of obtaining the stream of blasting particles are known in themselves and are described in, int.al., I. Horowitz, Oberflächenbehandlung mittels Strahlmitteln (Surface treatment by blasting means), Volume I, Zürich, Foster Verlag, 1976.

According to the process of the present invention, the substrate is simultaneously hit in the same place by a stream of a film forming binder. Examples of suitable binders are thermohardening, thermoplastic or elastomeric binders. Although use may be made of natural or semi-synthetic binders, including asphalts, bitumens, and natural rubbers, it is preferred that use should be made of synthetic binders; for example alkyd resins, saturated or unsaturated polyesters, phenol resins, polyterpenes, melamine resins, polyvinly resins, polystyrene, polyvinyl acetate, polyvinyl alcohol, polyacrylate resins or polymethacrylate resins, coumarone-indene resins, ketone resins and aldehyde resins, sulphonamide resins, polyurethanes, urethane alkyd resins, epoxy resins and pre-condensates thereof, cellulose resins and derivatives thereof, such as cellulose acetate, rubbers, such as saturated or unsaturated ethylene-α-olefin copolymers, butadiene-acrylonitrile copolymers, and water-dilutable binders. Examples of suitable inorganic binders include silicate binders, for instance: ethyl silicate.

The stream of binder also contains an inert or reactive organic dispersing agent and/or water. Examples of representative inert organic dispersing agents include hydrocarbons such as pentane, hexane, white spirit, petroleum ether, toluene and xylene; alcohols such as methanol, ethanol, isopropanol, butanol, 2-ethoxyethanol and 2-butoxyethanol; esters such as ethyl acetate and butyl acetate; ketones such as acetone, and other compounds, such as chlorinated hydrocarbons and nitrated hydrocarbons, such as nitropropane and nitroparaffin. As examples of suitable reactive dispersing agents may be mentioned styrene; (meth) acrylic esters such as ethyl acrylate, hexyl acrylate and 2-ethylhexyl methacrylate; epoxy compounds such as glycidyl methacrylate. The presence of water inhibits the formation of dust and clouding during the treatment. In the organic dispersing agent and/or water used, the binder may be dissolved or dispersed or emulsified.

According to the process of the present invention the substrate should simultaneously be hit by the stream of blasting particles and the stream of binder. In order that optimum results may be obtained the two streams should of course simultaneously hit the same spot on the substrate to be treated. Although with some embodiment of the process according to the invention it is possible for the stream of blasting particles and the stream of binder to be directed to the same spot on the substrate and to join the two streams very near the substrate, it is preferred that the two streams should be joined before they hit the substrate. For instance, the stream of binder may be injected as a fine spray into a stream of blasting particles emanating from a blast nozzle. It is preferred that the stream of binder should be injected into a stream of blasting particles obtained by introducing blasting particles in a fast air stream. The injection may then be effected in the conduit for the stream of blasting particles, optionally shortly before the nozzle of the conduit or just outside it. Optionally, the stream of binder may be injected into the stream of blasting particles in several places, for instance from one direction, or, if desired, from different directions, by making use of, for instance, a ring nozzle. It is, of course, also possible for the stream of binder to be introduced into the stream of blasting particles by suction or, possibly, under the influence of gravity instead of under superatmospheric pressure. Another embodiment of the process according to the invention consists in applying the film forming binder by airless spraying in such a manner that it hits the substrate at the same time as the stream of blasting particles. Embodiments in the parctice of this method are the airless spraying of a film forming binder positioned virtually coaxial in a stream of blasting particles emerging from a blast nozzle, from an air- or gas-driven blaster, or the use of a method such that the two streams are directed at different angles to the same spot of the substrate to be treated.

According to the process of the present invention, the substrate to be treated is cleaned by the blasting action of the stream of blasting particles and, upon drying, the binder applied covers the same part of the substrate in the form of a continuous coating. Rapid drying of the film forming binder may be of advantage then. This rapid drying may be obtained in a known manner, for instance by using a rapidly evaporating dispersing agent or in the presence of a catalyst which accelerates drying. Another method consists in heating the binder beforehand and/or on the substrate and/or in heating the stream of blasting particles. Increasing the temperature of the stream of binder also results in the viscosity of the binder being reduced and consequently in obtaining better spraying properties and, in the given case, better spreading on the substrate. It is preferred that drying should be accelerated by passing a heated or non-heated air stream over the binder applied to the substrate. Optionally, the substrate may be heated at a temperature of, for instance, 30°-90° C.

Optionally, the stream of blasting particles or the stream of binder or both streams may contain suitable additives. Representative additives include pigments, fillers, flatting agents, levelling agents, surfactants, catalysts, corrosion inhibiting compounds, agents having a germicidal effect and/or agents influencing the rheological behaviour. As examples of such substances may be mentioned iron oxide, magnesium silicate, titanium dioxide, barytes, talc, micaceous iron oxide, zinc dust, chromates, phosphates, corundum, polytetrafluoroethylene (PTFE) powder, tributly tin oxide and cuprous oxide.

If desired, the blasting particles may be enveloped in a pigment and/or an additive, more particularly a corrosion inhibiting compound. To that end the blasting particles are generally first wetted with a suitable adhesive to stick the pigment or the additive to the blasting agent. When use is made of this modified blasting agent, impingement on the substrate results in the pigment or additive used being at least partly deposited on the substrate. Consequently, in this embodiment of the process according to the invention the film forming binder and the pigment and/or additive are simultaneously applied to the substrate to be treated, so that the paint is as it were composed and deposited on the substrate in situ.

Alternatively, a pigment and/or an additive may be mixed with a modified or unmodified blasting agent. In another favourable embodiment the stream of binder contains a pigment and/or an additive. It is preferred, however, that use should be made of a stream of non-modified blasting particles and a stream of binder which may or may not contain one or more pigments. The invention will be illustrated in, but not limited by the following examples, in which the parts are parts by weight and the percentages are percentages by weight.

CONTROL EXAMPLE

A number of corroded steel panels (steel No. 52) were blasted to a degree of cleaning SA3 in accordnace with the Swedish Standard Method SIS 05 5900-1967 by means of a stream of air and coated copper slag emanating from a blast nozzle at a ratio of coated copper slag to air of 1.2 kg/m$^3$. The coated copper slag had been obtained by intermixing 1000 parts of copper slag having a particle size of 1–2 mm, 5 parts of coumarone-indene resin having an average molecular weight of 600 and 50 parts of zinc dust powder having a particle size of 1–5 μm. The stream containing the blasting agent was fed through a rubber tube having an internal diameter of 32 mm and at its end a blast nozzle having an internal diameter of 6 mm and blasted onto the panels at an angle of about 80°. The distance between the nozzle and the panel was about 45 cm. The air pressure in the tube, at a point just before the blast nozzle, was 7.5 bar.

The panels thus treated were exposed to outdoor weathering for 8, 24 or 168 hours, the day temperature being 5°-8° C. and the night temperature 2°-5° C. After 3.2 hours of exposure it began to rain, and after a period of 2.8 hours a rainfall of 1.8 mm was recorded. The number of hours it rained was on average about 5 per 24-hour day during the entire remaining period of exposure.

After exposure the panels were evaluated for degree of rusting in conformity with ASTM D610 (see Table 1). Next, the panels were brush-coated with a paint having a high filler content and based on an epoxy resin to a coating thickness of about 200 μm (in the cured state). The paint was composed as follows: 40 parts of a diglycidyl ether of bisphenol A having a molecular weight of 190–210, 10 parts of a reaction product of 1 mole of hexane diol and 2 moles of epichlorohydrin, and as hardener 20 parts of an adduct having an amine-equivalent weight of 82 of an epoxy resin having an epoxy-equivalent weight of 190–210 and of an excess of isophoron diamine, 15 parts of iron oxide pigment, 25 parts of barium sulphate, 45 parts of magnesium sulphate and 20 parts of micaceous iron oxide.

After allowing the paint to harden for 1 week at ambient temperature, the panels were subjected to the pull-off test in accordance with DIN 52 232 for adhesion to the substrate of the coating, the top coating having been applied to the substrate after the above-mentioned periods of exposure (8, 24 or 168 hours) (see Table 2, in which the values found are expressed in daN/cm$^2$).

Moreover, the panels were tested for blistering in accordance with ASTM D 870, the formation of the number (density) and the size of the blisters being followed until the value of 8-F was attained. For the 8- and 24-hour outdoor exposures the time elapsed was found to be >168 hours; but in the case of the outdoor exposure of 168 hours it turned out to be only 60 hours. For the Examples 1–6 the time required was >168 hours in all outdoor exposures.

EXAMPLE 1

The same procedure was employed as in the control example, with the exception that use was made of a composition A made up of 50 parts of a diglycidyl ether of bisphenol A having a molecular weight of 380 and an epoxy equivalent weight of 170–190, 55 parts of a water-emulsifiable adduct of a diglycidyl ether of bisphenol A and an excess of the amide of a dimer fatty acid having an equivalent weight of 210–240, 20 parts of 2-ethoxy ethanol and 500 parts of water, which composition was injected at a feed rate of 50 ml/min into a blasting agent-containing stream just before the latter left the blast nozzle.

The panels thus obtained were tested and treated in the same way as indicated in the control example. The values found are given in Tables 1 and 2.

EXAMPLE 2

The procedure of Example 1 was repeated, except that instead of composition A composition B was used. It consisted of 40 parts of an aqueous dispersion of a copolymer built up of 40% of styrene, 50% of ethyl acrylate and 10% of butyl acrylate having a particle size of 0.1–0.3 μm and a solids content of 50% and containing 60 parts water. This composition was injected at a feed rate of 100 ml/min. The values found are given in Table 1–2.

EXAMPLE 3

The same procedure was used as in Example 1, except that composition A was replaced with composition C, which consisted of 50 parts of a diglycidyl ether of bisphenol A having a molecular weight of 370 and an epoxy equivalent weight of 180–200, 30 parts of a dimer fatty acid amide having a viscosity of 400–800 mPa.s at 25° C. and an amine-active H-equivalent weight of 115, 32 parts of ethoxyethanol, 96 parts of isopropyl alcohol and 190 parts of butyl acetate. This composition was injected at a feed rate of 75 ml/min. As blasting agent there was used a mixture of 1000 parts of copper slag having a particle size of 1–2 mm and 100 parts of zinc dust powder having a particle size of 1–5 μm. The values found are given in Tables 1–2.

EXAMPLE 4

The control example was repeated in such a way that as blasting agent the copper slag was employed in its unmodified form and there was used a composition D made up of 6.3 parts of a 75%-solution in xylene of a bisphenol A diglycidyl ether having a molecular weight of 900 and an epoxy equivalent weight of 450–500, 3.4 parts of a 70%-solution in xylene of a dimer fatty acid amide having an amine number of 240–260, 75.3 parts of zinc dust powder having a particle size of 0.5–3 μm, parts of ethanol, 2 parts of 2-ethoxyethanol and 60 parts of toluene. This composition was injected into the stream containing the blasting agent at a feed rate of 50 ml/min just before the point where the latter leaves the blast nozzle. The values found are given in Tables 1 and 2.

EXAMPLE 5

The same procedure was used as in Example 4, with the exception that instead of composition D there was employed a composition E, which consisted of 12 parts of a synthetic polyisoprene rubber having a chlorine content of 67% and a weight average molecular weight of 170,000, 4 parts of a 67%-solution in white spirit of a colophony modified linseed oil alkyd resin built up of 32% of linseed oil, 5% of pentaerythritol and 63% of colophony, 14 parts of phenylisopropyl phenyl phosphate, 20 parts of zinc chromate, 5 parts of titanium dioxide and 120 parts of white spirit. The composition was injected at a feed rate of 60 ml/min. The values found are given in Tables 1 and 2.

EXAMPLE 6

Example 4 was repeated in such a way that instead of composition D a composition F was used, which consisted of 10 parts of a diglycidyl ether of bisphenol A having a molecular weight of 370 and an epoxy equivalent weight of 180–200, 15 parts of a lead-zinc salt of 5-nitroisophthalic acid, 10 parts of a red iron oxide pigment, 5 parts of talc, 5 parts of 2-ethoxyethanol, 10 parts of ethanol, 12 parts of a dimer fatty acid amide having an active-H-equivalent weight of 214 and 60 parts of water. The composition was injected at a feed rate of 75 ml/ min. The values found are given in Tables 1 and 2.

EXAMPLE 7

Example 1 was repeated, with the exception that in the coating of the copper slag use was made of 5 parts of a glycidyl ether of Bisphenol A having a molecular weight of 190–210 (available under the trade name of Epoxy 828 of Shell) instead of the 5 parts of coumarone-indene resin. The values found are given in Tables 1–2.

TABLE 1

| | rust formation after | | | | | |
|---|---|---|---|---|---|---|
| | 8 hours | | 24 hours | | 168 hours | |
| Examples | panel | coating | panel | coating | panel | coating |
| 1 | 10 | 9 | 10 | 9 | 10 | 9 |
| 2 | 10 | 10 | 10 | 10 | 10 | 10 |
| 3 | 10 | 9 | 10 | 9 | 10 | 9 |
| 4 | 10 | 9 | 10 | 9 | 10 | 9 |
| 5 | 10 | 10 | 10 | 10 | 10 | 10 |
| 6 | 10 | 9 | 10 | 9 | 10 | 9 |
| 7 | 10 | 9 | 10 | 9 | 10 | 9 |
| control | 10 | 5 | 10 | 1 | 7 | 1 |

TABLE 2

| | Adhesion after an exposure of | | |
|---|---|---|---|
| Examples | 8 hours | 24 hours | 168 hours |
| 1 | 90 | 95 | 95 |
| 2 | 60 | 60 | 65 |
| 3 | 150 | 147 | 149 |
| 4 | 120 | 110 | 130 |
| 5 | 60 | 70 | 60 |
| 6 | 80 | 80 | 75 |
| 7 | 95 | 105 | 95 |
| control | 90 | 70 | 5 |

EXAMPLE 8

A number of corroded steel panels (steel No. 52) were completely freed from rust by blasting them at a temperature of 15° C. and a relative humidity of 100% with copper slag having a particle size of 1–2 mm at a ratio copper slag to air of 1.2 kg/m$^3$ and a blasting speed of 5 min/m$^2$. The blasting agent-containing air stream was supplied through a rubber tube having an internal diameter of 32 mm and at its end a blast nozzle and blasted onto the panels at angle of 80°. The distance between the nozzle and the panel was about 45 cm. The air pressure in the hose at a point immediately before the blast nozzle was 7 bar. During the blasting treatment a stream of inorganic binder was injected into the blasting agent-containing air stream at a point in the tube just before the nozzle and at a rate of 170 ml/min. The inorganic binder was a 37.6% aqueous solution of a mixture of methyl triethanol ammonium silicate (44% of $SiO_2$ and 9.6% of quaternary ammonium) and sodium silicate, the weight ratio of $Na_2O$ to total $SiO_2$ being 1:3,2. To the aqueous silicate solution there had been added per part 2.5 parts of a zinc dust (99.5% pure zinc) having a particle size of 1–5 μm.

After the blasting treatment the panels were conditioned for 2 hours at a temperature of 15° C. and a relative humidity of 100%, followed by exposing the panels for 2 hours to a fine spray of water of 50 ml/min/m$^2$.

A number of the panels thus pretreated were subjected for 2 months to a blistering test in accordance with ASTM B 117, for 1 month to a salt spray test in accordance with ASTM B 117 or exposed to 2 months of outdoor weathering with southern exposure at an angle of 45°. The panels were exclusively evaluated for rust formation in accordance with ASTM D 610. The results are given in Table 3.

Another part of the panels thus pretreated were conditioned for 48 hours at a temperature of 20° C. and a relative humidity of 65% and subsequently coated to a thickness of about 200 μm (in the cured state) with a paint having a high filler content and based on an epoxy resin. The composition of the paint was the same as that given in the control example. After the paint had been left to harden for 1 week at ambient temperature, the painted panels were subjected to the same blistering test or salt spray test to which the non-painted panels were subjected and they were exposed to 6 months of outdoor weathering while facing south at an angle of 45°, the panels having been provided with a scratch. The results are given in Table 3.

For comparison (Control part A), the corroded steel panels (steel No. 52) were blasted in the same manner as described in the preceding part, but without injecting the stream of inorganic binder. Of the resulting panels the degree of cleaning was SA 3, in accordance with the Swedish Standard SIS 05 5900-1967. Subsequently, the panels were conditioned for 4 hours at a temperature of 15° C. and a relative humidity of 95%. Next, a number of these panels were spray-coated with the same stream of zinc dust-containing binder as described in the first part of this example, use being made of an airless sprayer and a pressure ratio of 1:2. Part of the resulting panels were subjected to the same tests as the panels in the first part of this example, which had not been provided with a coating of paint having a high filler content. The results are given in Table 3. Another part of the blasted and silicate coated panels were conditioned in the same manner as indicated in the first part of this example, at a temperature of 20° C. and a relative humidity of 65%, coated with an epoxy paint having a high filler content and, after curing, tested in the same manner as the afore described painted panels. The results are given in Table 3.

Also for comparison (control part B), the procedure of Control part A was entirely repeated, the conditioning treatment after blasting being replaced with 5 minutes of exposure of the panels to a fine water spray of 50 ml/min/m$^2$. The results are given in Table 3.

TABLE 3

| | Results of | | |
|---|---|---|---|
| Panels obtained by | Blistering test | Salt spray test | 2 months' outdoor weather exposure |
| The process of the invention | 10 | 10 | 10 |
| Control part A | 4 | 2 | 8 |
| Control part B | 0 | 0 | 6 |
| Panels coated with a paint with high filler content, obtained by | Blistering test | Salt spray test | 6 months' outdoor weather exposure |
| The process of the present invention | 10 | <0.5 mm 10 | <0.05 mm 10 |
| Control part A | 6M | >10 mm 2D | 2 mm 8F |
| Control part B | 2D | >10 mm 2D | 6 mm 6M |

What is claimed is:

1. A process for applying a coating composition to an iron-containing metal substrate, comprising:
 cleaning the metal substrate by means of an abrasive blasting treatment in which the metal substrate is hit by a stream containing abrasive blasting particles, said stream comprising a stream of gas emanating from a blast nozzle at a pressure in the range of 2 to 10 bar and at a feed rate of 0.1 to 12 m$^3$/min; and
 applying a coating composition comprising a film-forming binder to the metal substrate by means of a coating treatment in which the metal substrate is hit with a stream of the film-forming binder simultaneously with the abrasive blasting treatment, said film-forming binder being selected from the group consisting of thermohardening, thermoplastic and elastomeric film-forming binders.

2. The process of claim 1, wherein the stream of binder and the stream of blasting particles are joined before the latter hits the substrate.

3. The process of claim 2, wherein the stream of binder is injected into the stream of blasting particles.

4. The process of claim 1, wherein the stream of binder also contains a component selected from the class consisting of an orgainic dispersing agent and water.

5. The process of claim 1, wherein the stream of binder is applied by airless spraying.

6. The process of claim 1, wherein the blasting particles are enveloped in a component selected from the class consisting of a pigment and an additive.

7. The process of claim 6, wherein the blasting particles are enveloped in a corrosion inhibiting compound.

8. The process of claim 1, wherein the blasting particles are mixed with a component selected from the class consisting of a pigment and an additive.

9. The process of claim 1, wherein the stream of binder contains a component selected from the class consisting of a pigment and an additive.

10. A substrate coated by the process of claim 1.

* * * * *